(12) United States Patent  (10) Patent No.: US 7,586,041 B2
VanderVelde et al.  (45) Date of Patent: *Sep. 8, 2009

(54) METAL RACEWAY SYSTEM

(75) Inventors: Charles VanderVelde, Frankfort, IL (US); Randall T Woods, St. Charles, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/144,807

(22) Filed: Jun. 24, 2008

(65) Prior Publication Data

US 2008/0289847 A1  Nov. 27, 2008

Related U.S. Application Data

(63) Continuation of application No. 11/465,518, filed on Aug. 18, 2006, now Pat. No. 7,408,114.
(60) Provisional application No. 60/710,414, filed on Aug. 23, 2005.

(51) Int. Cl.
*H02G 3/04* (2006.01)
(52) U.S. Cl. ............... 174/68.3; 174/480; 174/481; 174/68.1; 52/220.7
(58) Field of Classification Search ............... 174/480, 174/481, 68.3, 68.1, 60, 67, 95, 97, 99 R, 174/98, 135, 72 R; 220/3.8, 3.3, 3.5, 3.7; 385/134, 135; 52/220.1, 220.3, 220.7, 220.8, 52/249; 439/207, 209, 210, 211, 212, 213
See application file for complete search history.

(56) References Cited

U.S. PATENT DOCUMENTS

| | | | |
|---|---|---|---|
| 2,790,653 A | 4/1957 | Murphy | |
| 3,347,275 A | 10/1967 | Murphy | |
| 3,404,706 A | 10/1968 | D'Esopo | |
| 4,017,137 A | 4/1977 | Parks | |
| 5,024,614 A | 6/1991 | Dola et al. | |
| 5,086,195 A | 2/1992 | Claisse | |
| 5,271,585 A * | 12/1993 | Zetena, Jr. | 174/95 |
| 5,272,282 A | 12/1993 | Wiesemann | |
| 5,336,849 A | 8/1994 | Whitney | |
| 5,359,143 A | 10/1994 | Simon | |

(Continued)

OTHER PUBLICATIONS

Wiremold 4000 Series Steel Raceway catalog, pp. 1-12, Oct. 2004.
Mon-Systems, Inc.'s Snapmark SMS4200 Series catalog, pp. 16-23; SMS4200 assembly instructions; SMS4203 assembly instructions, date unknown.

(Continued)

*Primary Examiner*—Angel R Estrada
(74) *Attorney, Agent, or Firm*—Robert A. McCann; Christopher S. Clancy

(57) ABSTRACT

The present invention is directed to a raceway system including a base, at least two covers and a faceplate. The base includes sidewalls having a top wall with a flange member. The covers include a top portion having two ends with a flange member at each end. The flange members of the covers are in mating engagement with the flange members of the base when the cover is coupled to the base. The cover is flush with the base when it is coupled to the base. The faceplate is installed on the raceway so that it overlaps a portion of each cover and extends over and is flush with a portion of the top walls of the base.

5 Claims, 4 Drawing Sheets

U.S. PATENT DOCUMENTS

| | | | |
|---|---|---|---|
| 5,614,695 A * | 3/1997 | Benito Navazo | 174/480 |
| 5,732,747 A | 3/1998 | Holliday | |
| 5,861,576 A | 1/1999 | Langston et al. | |
| 5,879,185 A | 3/1999 | Handler et al. | |
| 5,957,414 A | 9/1999 | Perrignon de Troyes et al. | |
| 6,150,610 A | 11/2000 | Sutton | |
| D498,211 S | 11/2004 | Thibault | |
| 7,009,108 B2 | 3/2006 | Vargas et al. | |
| 7,388,163 B2 * | 6/2008 | VanderVelde et al. | 174/68.3 |
| 7,408,114 B2 * | 8/2008 | VanderVelde et al. | 174/68.3 |

OTHER PUBLICATIONS

Thomas & Betts SR600 Series Raceway Systems catalog, pp. 22-26, 2002.

* cited by examiner

METAL RACEWAY SYSTEM

CROSS-REFERENCE TO RELATED APPLICATIONS

This application is a continuation of U.S. application Ser. No. 11/465,518, filed Aug. 18, 2006, which claims priority to U.S. Provisional Application Ser. No. 60/710,414, filed on Aug. 23, 2005, the entirety of which is hereby incorporated by reference.

FIELD OF THE INVENTION

The present invention relates generally to a metal raceway system and, more specifically, relates to a multiple-channel metal raceway system.

BACKGROUND OF THE INVENTION

Multiple-channel metal raceways are used to route power wiring (or communication cable) along surfaces such as walls, floors, ceilings or on other fixed structures. Raceways provide a convenient way to manage electrical wiring for multiple circuits and/or communication cables while keeping them out of sight and eliminate the physical and network dangers associated with exposure. The multiple-channel raceways thus provide an aesthetic and easy way to route wiring or cables from a power source or network entrance to a desired location. It is important for these systems, which carry both power and communication cables, to meet the existing applicable standards such as U.L. One way for systems to fail to meet the standards is if gaps or other large spaces exist in the system.

FIG. 1 illustrates one example of current multiple-channel metal raceway designs. As shown, a multiple-channel raceway 1 includes a bottom portion 2 and a cover 4. The bottom portion 2 includes a bottom wall 6 and two sidewalls 8. Cover 4 attaches onto the top of the bottom portion 2, creating a channel 7. During installation of a metal raceway system, faceplates (not shown) having an appropriate number of outlets (electrical power outlets and/or communication outlets) are mounted to the bottom portion and fit into openings created in or between the covers 4. Faceplates should be mounted thereon in a position to overlap a portion of the cover to avoid gaps or seams between the faceplate and covers. In the case of the raceway system shown in FIG. 1, when a standard faceplate is mounted to overlap the covers a gap over the sidewalls will exist. Thus, a specially designed faceplate must be used that fills in the gap.

Prior to installation the installers generally have ordered all of the parts, including the faceplates, based on a plan that details the layout of the raceway. The layout includes the number and types of faceplates that are needed or desired. However, during installation, the customer may change the layout, including the location, number and type of faceplates. This can be especially frustrating to the installer, because the installer usually cannot purchase the faceplate off-the-shelf at a supplier and must instead order the parts causing delays in the project.

Therefore, there is a need for a multiple-channel metal raceway that is designed to accommodate readily available faceplates that can be purchased off-the-shelf and still meets the applicable standards.

SUMMARY OF THE INVENTION

The present invention is directed to a multi-channel raceway system that includes a base and a cover that is flush with the base when it is coupled to the base. The base includes sidewalls having a top wall with flange members. The cover includes a top portion having two ends with a flange member at each end. The flange members of the cover matingly engage the flange members of the base to enable the cover to be flush with the base. The multi-channel raceway system also includes a faceplate that overlaps a portion of the cover and extends over and is flush with a portion of the top walls of the base when installed on the raceway.

BRIEF DESCRIPTION OF THE DRAWINGS

FIG. 2b is an end view of the multiple-channel raceway system of FIG. 2a; and

DETAILED DESCRIPTION OF THE ILLUSTRATED EMBODIMENTS

Figure 2A:
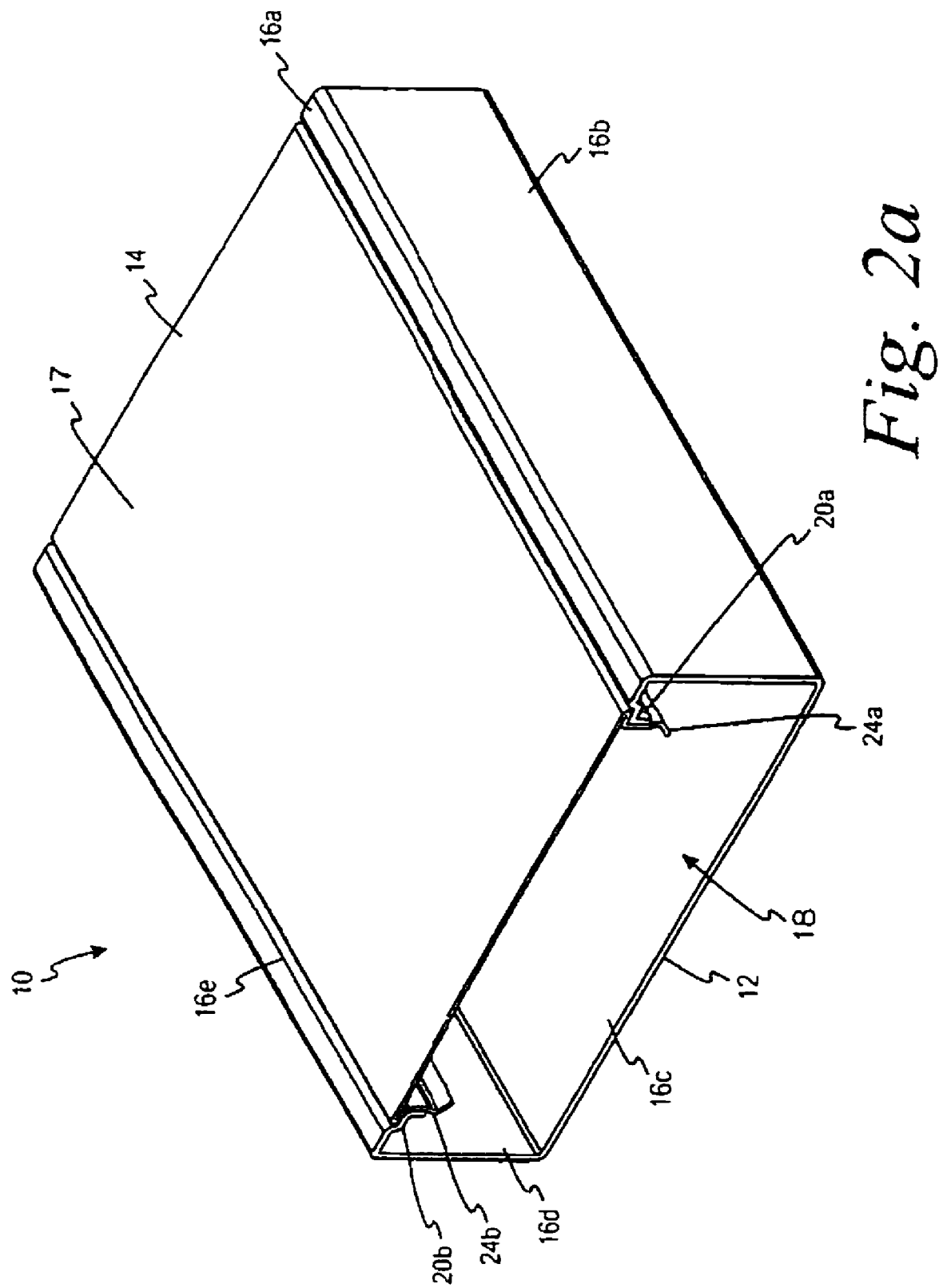
FIG. 2a is a perspective view of a multiple-channel raceway system according to one embodiment of the present invention.
Figure 2B:
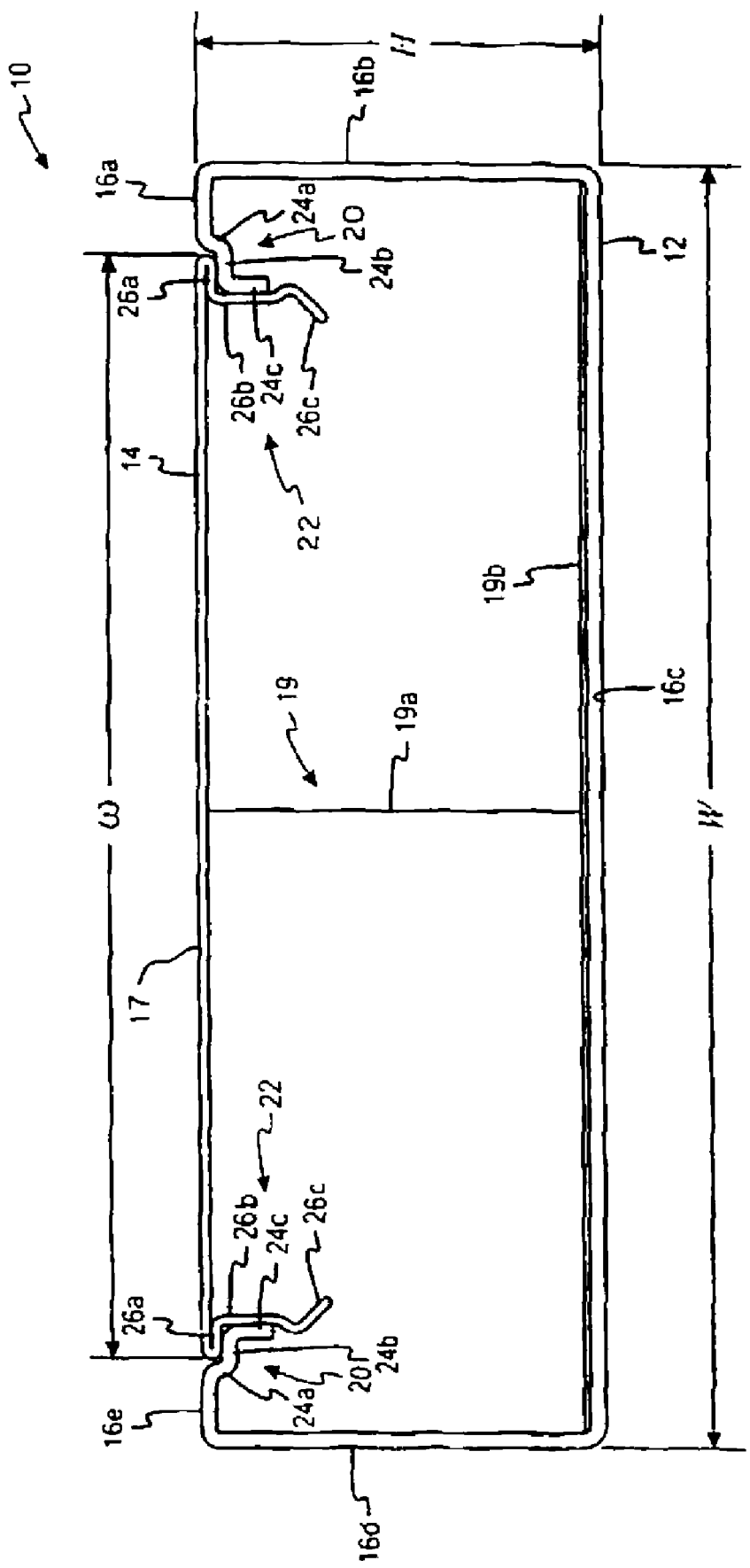

FIGS. 2a and 2b illustrate one embodiment of a multiple-channel raceway 10. The term "multiple-channel raceway" refers to a raceway that has at least one channel and may be divided into multiple channels. In some embodiments, the multiple-channel raceway 10 may only have a large single channel that can accommodate a greater number of cables than a standard "single-channel raceway."

In the embodiments illustrated in FIGS. 2a and 2b, the multiple-channel raceway 10 has a base 12 and a cover 14. According to one embodiment of the present invention, the base 12 is a one-piece, roll-formed raceway that includes five walls 16a, 16b, 16c, 16d, and 16e. The cover 14 includes a top portion 17. When the cover 14 is coupled to the base 12, a channel 18 is created. The channel 18 may be used for receiving cables such as power and/or communication cables.

As shown in FIG. 2b, a divider 19 is inserted into the channel 18. The divider 19 is used to isolate the different types of cables from one another. In the illustrated embodiment, the divider 19 includes a single dividing wall 19a that is parallel to the sidewalls 16b, 16d of the base 12 and a base 19b that abuts the bottom wall 16c of the base 12. Other types of known dividers may also be used. In this embodiment, two sub-channels (or multiple channels) are created. In other embodiments, the divider 19 may include any number of dividing walls 19a, creating more sub-channels. Because the base 19b of the metal divider 19 is in contact with the bottom wall 16c of the base 12, the base 12 and the metal divider 19 are electrically bonded. For safety reasons, the base 12 is grounded. Thus, the metal divider 19 is also grounded. If only one type of wire and/or cable is to be used, then no divider 19 would be necessary. Also, the cover 14 is electrically bonded to the base 12 and, therefore, grounded.

As shown in FIG. 2b, one embodiment of coupling the cover 14 to the base 12 will be described. In this embodiment, the base 12 includes a flange 20 and the cover 14 includes a corresponding flange 22. The flange 20 of the base 12 has a shape that substantially corresponds to the shape of the corresponding flange 22. In other words, when the cover 14 is coupled to the base 12, the flange 20 of the base 12 is in mating engagement with the flange 22 of the cover 14.

Specifically, the flange 20 of the base 12 includes three portions: a first downwardly extending portion 24a that extends downwardly into the channel 18 from the top walls 16a, 16e of the base 12: a shelf portion 24b that extends into the channel 18 in a direction that is parallel with the top walls 16a, 16e; and a second downwardly extending portion 24c that extends downward into the channel 18 in a direction that is parallel to the sidewalls 16b, 16d.

The corresponding flange 22 of the cover 14 includes three portions: a first, flat portion 26a that is parallel to the top portion 17 of the cover 14 and underlies the cover 14; a downwardly extending portion 26b that extends downwardly into the channel 18 and is perpendicular to the top portion 17 of the cover 14; and a curved portion 26c that projects downwardly at an angle into the channel 18.

When the cover 14 is attached to the base 12, the flange 20 of the base 12 mates with the flange 22 of the cover 14. More specifically the first, flat portion 26a of the cover 14 rests on the shelf portion 24b of the base 12 and the downwardly extending portion 26b of the cover 14 abuts the second downwardly extending portion 24c of the base 12. The curved portion 26c of the cover 14 is designed such that a portion of the curved portion 26c is directly below the second downwardly extending portion 24c of the base 12. By having a part of the corresponding flange 22 of the cover 14 underneath the flange 20 of the base 12, the base 12 and the cover 14 are securely engaged. Also, the curved portion 26c of the cover 14 is flexible relative to the flange 20 of the base 12, which allows the cover 14 to releasably engage the base 12. Also, the cover 14 is removable from the base 12.

Other embodiments include those in which a portion of the base 12 mates with a corresponding portion of the cover 14. The above is merely one embodiment of the present invention. In some embodiments, the cover may not be removable. In some embodiments, the cover may be attachable to the base via methods other than mating engagement. In other words, the cover may be attached via welding or a fastener, such as a screw.

Figure 1:
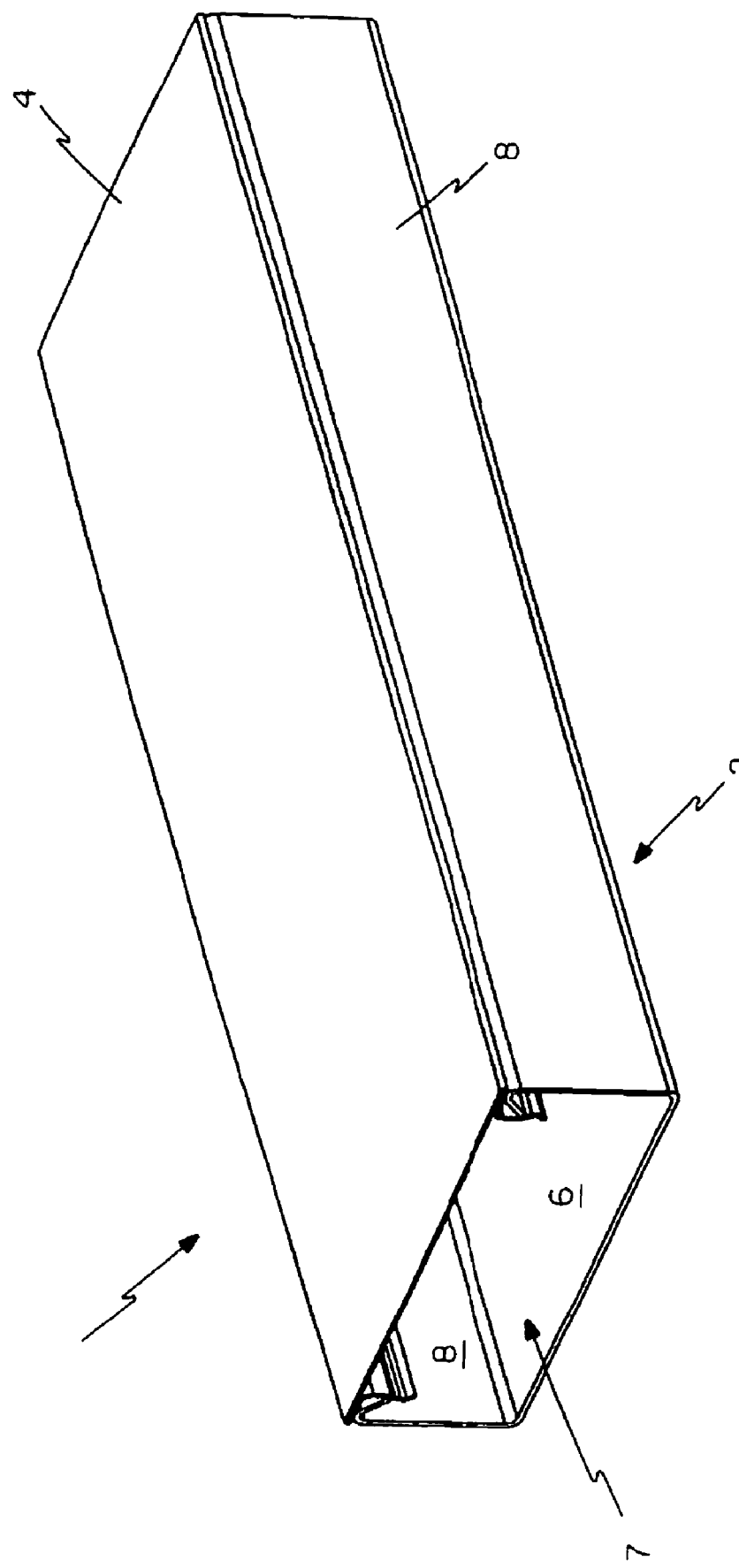
FIG. 1 is a perspective view of a prior art multiple-channel raceway system.

As can be seen in FIG. 2b, when the cover 14 is mated with the base 12, the top portion 17 of the cover 14 is flush with the top walls 16a, 16e of the base 12. In other words, the top portion 17 of the cover 14 is level with the top walls 16a, 16e of the base 12. Also, the top portion 17 is as high as the top of the sidewalls 16b, 16d. The width W of the entire top area (cover 14 and two top walls 16a, 16e) is between about four inches and six inches, preferably between four and a half inches and five and a half inches. In comparison, the width w of the top portion 17 of the cover 14 is between about three and a half inches and five inches, preferably between about four inches and four and three quarters inches. By increasing the width W of the overall top of the multiple-channel raceway 10, the installer may now install almost any faceplate having a width less than the total width W of the raceway 10. Prior multiple-channel raceways, such as raceway 1 shown in FIG. 1, only have a width that is the same as the width w of the cover, thus, decreasing the ability to use any standard, off-the-shelf faceplate.

After mounting of base 12 to the desired mounting surface, the installer may then lay the wires and/or cables in place in channel 18 (or sub-channels) prior to the attachment of the cover 14 onto the base 12. In other embodiments, the wires and/or cables may be snaked through the channel 18 (or sub-channels) prior to the attachment of the cover 14 onto the base 12. According to one embodiment, when the base 12, cover 14 and dividers 19 are all attached, they are all electrically bonded to one another, as described above.

Figure 3:
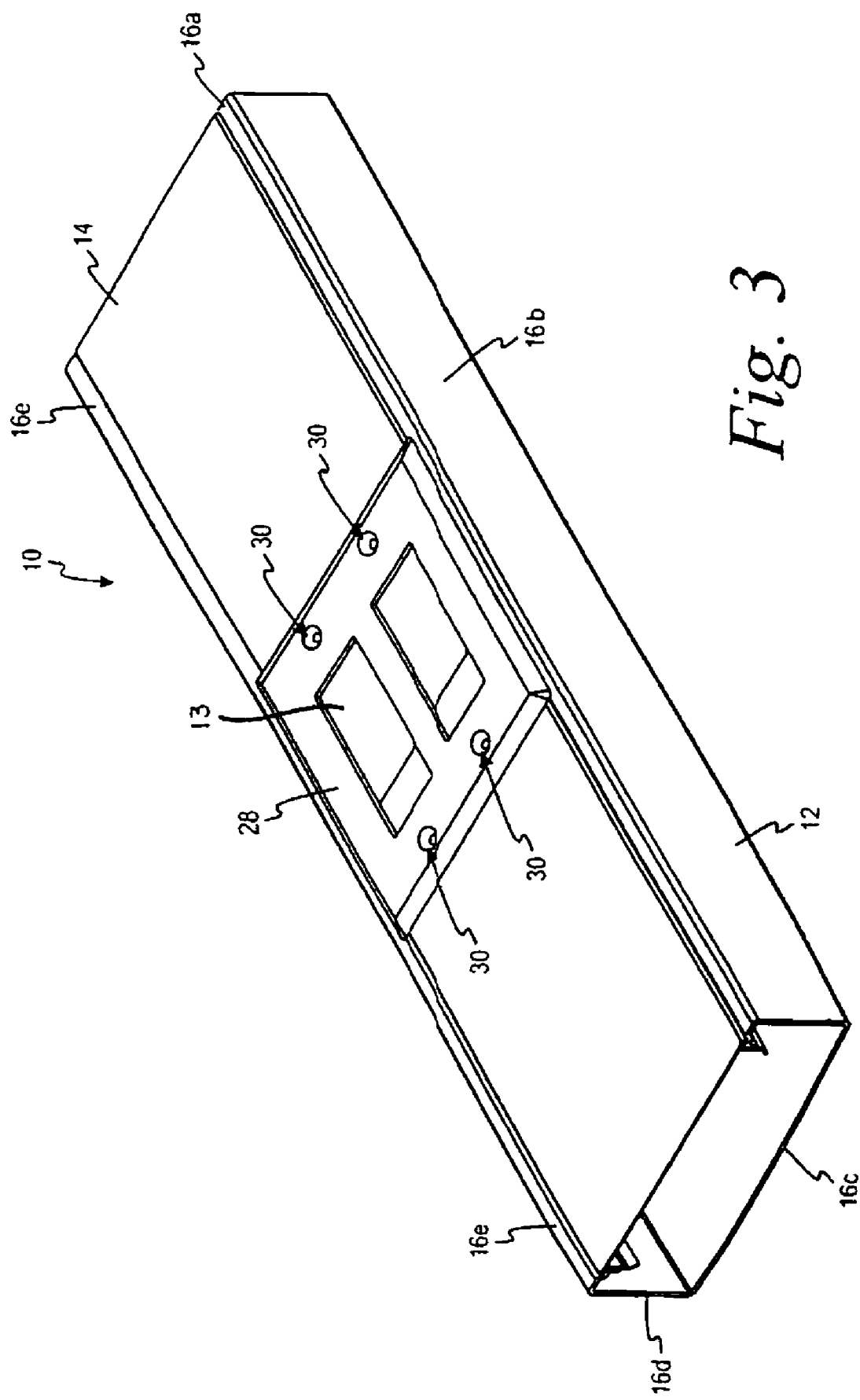
FIG. 3 is a perspective view of the multiple-channel raceway system of FIG. 2a, with a faceplate according to one embodiment of the present invention.

FIG. 3 illustrates a perspective view of one embodiment of a multiple-channel raceway system having a base 12 and multiple covers 14. The covers 14 are coupled to the base 12 leaving an opening 13 for a device bracket and various receptacles (not shown). In this embodiment, a two-gang faceplate 28 with four screw holes 30 is attached to the raceway 10. The faceplate 28 is positioned over the opening 13 such that the faceplate 28 extends slightly over the edge of the cover 14. The faceplate 28 also extends over and is flush with a portion of the top walls 16a, 16e of the base 12. As a result, when the faceplate is installed on the raceway, there are no gaps or openings between the faceplate and the raceway. Additionally, since the top portion 17 of the cover 14 is flush (or level) with the top walls 16a, 16e of the base 12, various standard sized faceplates may be used to cover the opening 13 between the covers in the raceway.

Generally, the multiple-channel raceways 10 are sold in lengths of five feet and are then cut to fit the required length. However, in other embodiments, the multiple-channel raceways 10 may be of different lengths. Also, in other embodiments, the height of the base 12 may be varied. In one embodiment, the height is between about 1.40 inches and about 1.80 inches. The multiple-channel raceway may be made of metal, such as painted, galvanized or galvanealed cold-rolled steel.

In the illustrated embodiment, a two-gang faceplate is illustrated. However, any faceplate that has at least one dimension that is less than the width W of the raceway 10 may be attached to the multiple-channel raceway. The faceplate may be an off-the-shelf faceplate or a specially ordered faceplate. The faceplate may accommodate any combination of power and/or communication cables.

While particular embodiments and applications of the present invention have been illustrated and described, it is to be understood that the invention is not limited to the precise construction and compositions disclosed herein and that various modifications, changes, and variations may be apparent from the foregoing descriptions without departing from the invention.

What is claimed is:

1. A metal raceway system comprising:
a metal raceway having a base and at least two covers, wherein the base includes sidewalls, each sidewall having a top wall with a flange member including a shelf portion disposed below the top wall and a downwardly extending portion extending from the shelf portion and the at least two covers include a top portion having two ends with a flange member at each end, wherein the flange members of the covers include a flat portion parallel to the top portion of the at least two covers, a downwardly extending portion and a curved portion.

2. The raceway system of claim 1, wherein the entire curved portions extend below the downwardly extending portions of the flange members of the base.

3. The raceway system of claim 1, wherein the shelf portion of the base flange member extends in a direction parallel to the top wall.

4. The raceway system of claim 1, wherein the flange members of the covers are in mating engagement with the flange members of the base.

5. The raceway system of claim 1, further including a faceplate installed on the raceway, wherein the faceplate overlaps a portion of the covers and extends over a portion of the top walls of the base.

* * * * *